July 8, 1941.   R. C. WILSON ET AL   2,248,150
AIR-COOLED ENGINE COWLING
Filed March 24, 1938   3 Sheets-Sheet 1
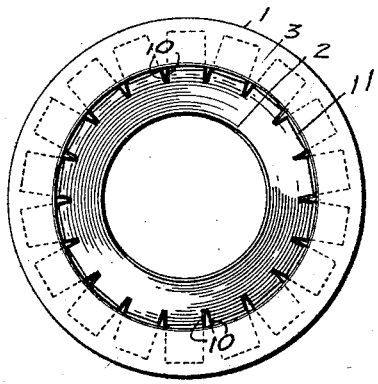
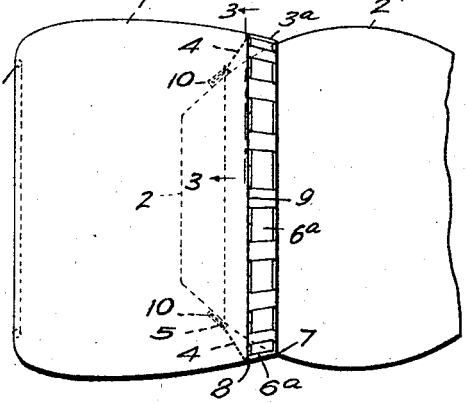
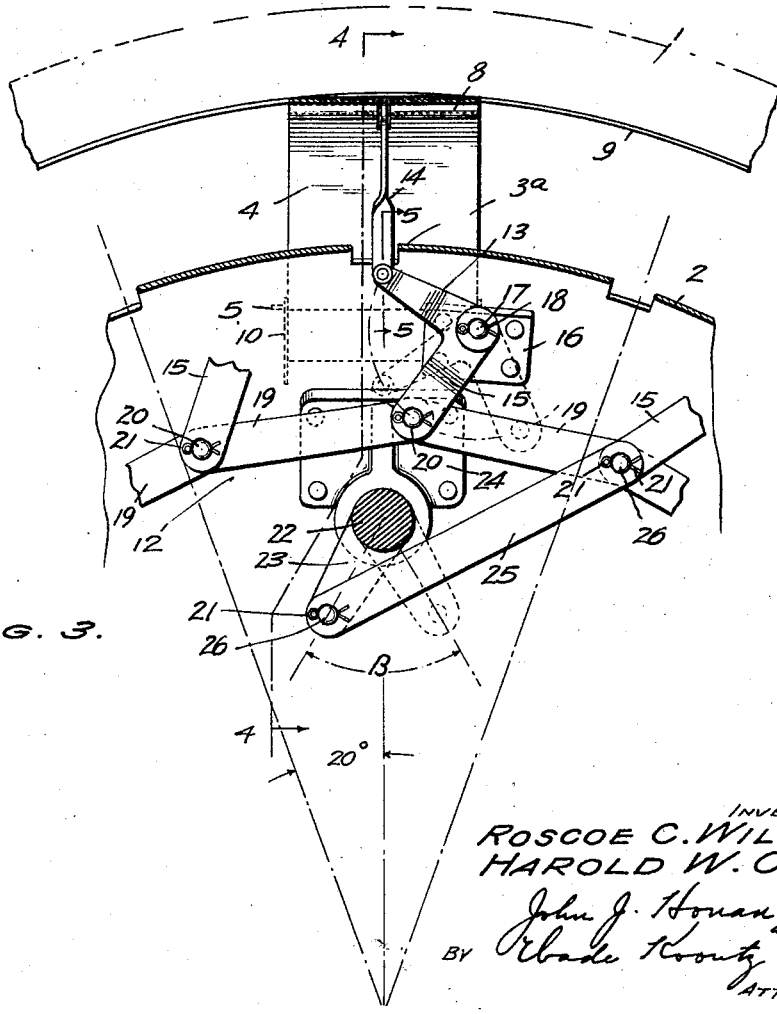
INVENTORS
ROSCOE C. WILSON
HAROLD W. CASE
BY John J. Honan and Ebade Koontz
ATTORNEYS

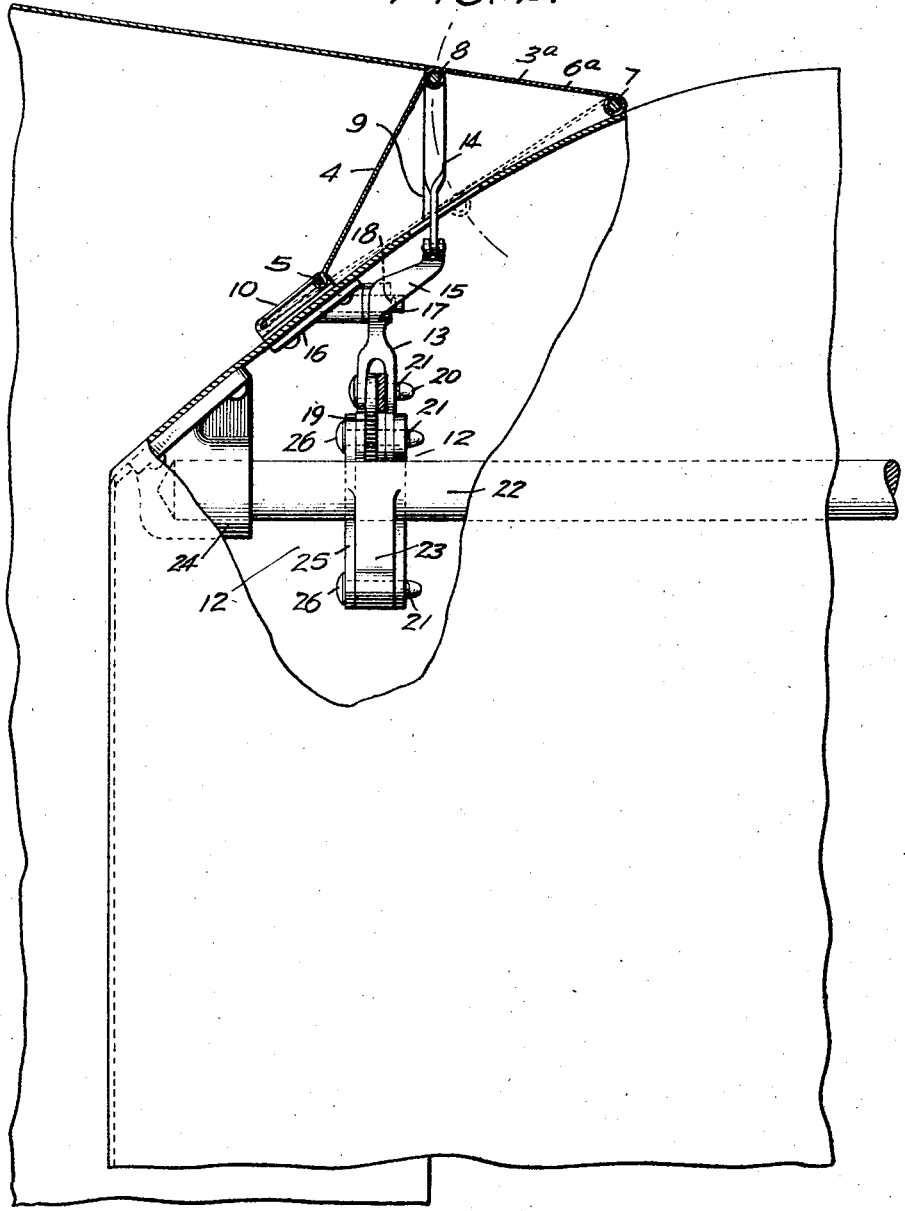
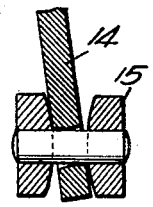

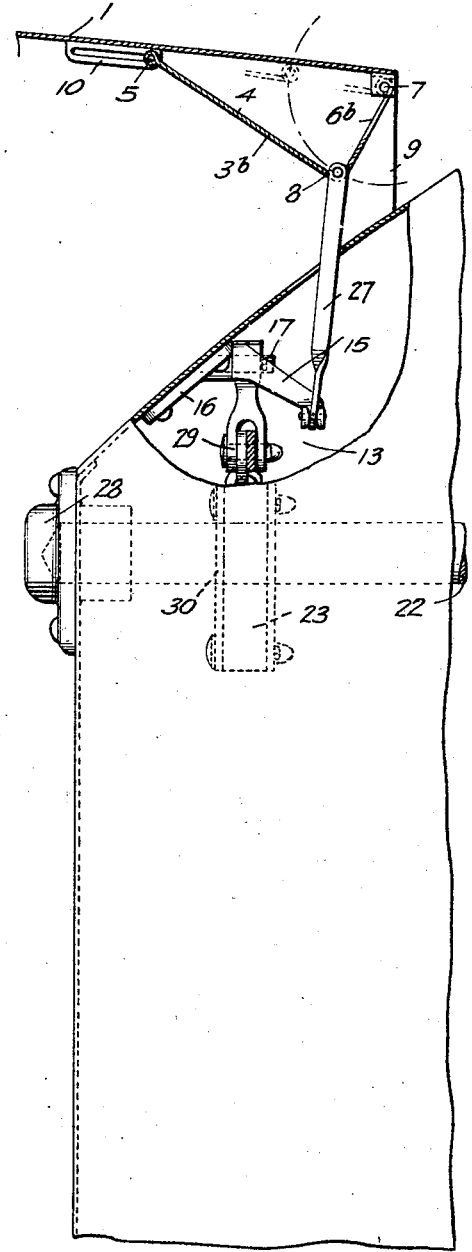
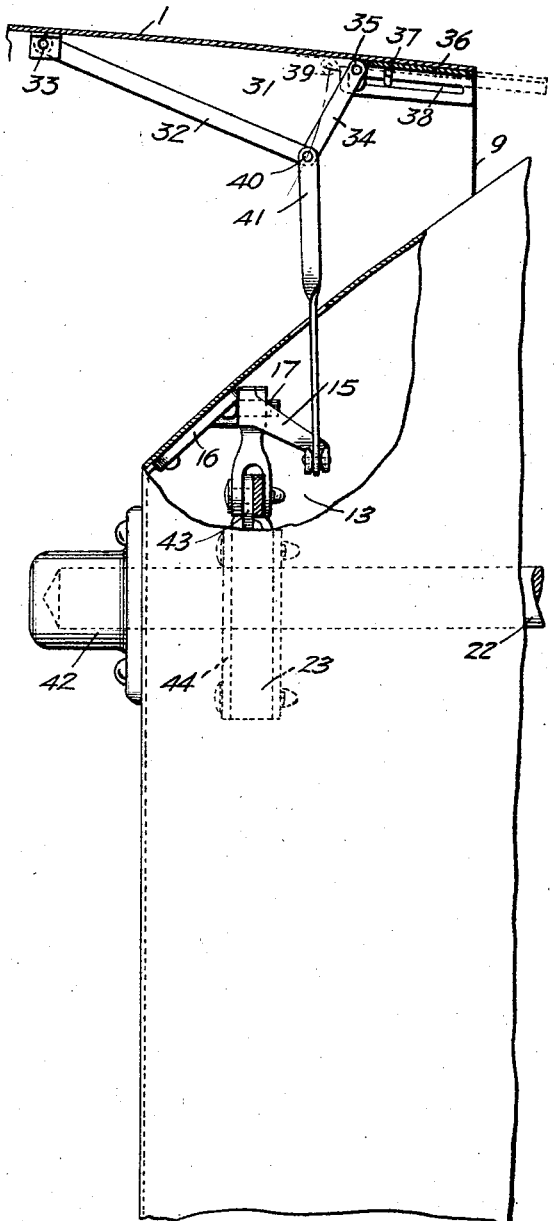

Patented July 8, 1941

2,248,150

UNITED STATES PATENT OFFICE 2,248,150

AIR-COOLED ENGINE COWLING

Roscoe C. Wilson, West Point, N. Y., and Harold W. Case, Dayton, Ohio

Application March 24, 1938, Serial No. 197,885

10 Claims. (Cl. 244—53)

(Granted under the act of March 3, 1883, as amended April 30, 1928; 370 O. G. 757)

The invention described herein may be manufactured and used by or for the Government for governmental purposes, without the payment to us of any royalty thereon.

We are familiar with numerous shutter or flap devices applied to the leading or trailing edges of annular cowlings for controlling the temperature of radial air-cooled engines. While such devices operate efficiently as to their cooling function, they seriously interfere with desired air flow in the vicinity of the cowling proper, thereby not only increasing the drag of the aircraft to which they are attached, but also inducing serious tail buffeting as a direct result of disruption of the air flow over and around the cowling.

It is a primary object of our invention to provide for the controlling of radial air-cooled engine temperature in such a manner that air will flow from our improved cowling without turbulence.

Other objects and advantages of our invention will become apparent from the following description taken in connection with the accompanying drawings, it being clearly understood that the same are by way of illustration and example only and are not to be taken as in any way limiting the spirit or scope of our invention. The spirit and scope of the invention is to be limited only by the prior art and by the terms of the appended claims.

Referring to the drawings, in which numerals of like character designate similar parts throughout the several claims:

Fig. 1 is a front view of an aircraft fuselage with our engine cowling attached thereto;

Fig. 2 is a side view of Fig. 1;

Fig. 3 is a cross-sectional view, taken on the line 3—3, of Fig. 2;

Fig. 4 is a cross-sectional view, taken on the line 4—4, of Fig. 3;

Fig. 5 is a cross-sectional view, taken on the line 5—5, of Fig. 3;

Fig. 6 shows shutter attachment directly to the annular cowling; and

Fig. 7 shows a shutter arrangement longitudinally extensible and retractable aft of the trailing edge of the annular cowling.

Since the annular cowling 1 and the fuselage nose 2 of Figs. 1 through 7 are of a form well known to those skilled in the art, and since our invention is concerned solely with the trailing edge portion of the cowling 1, an outline of the engine profile is not deemed essential to a proper showing of the invention. The fuselage nose 2 constitutes a mounting structure for the engine and the cowling, however, it is to be understood that it is intended to use the invention with any suitable air-cooled engine and mounting structure therefor in any location where the problems sought to be overcome by the instant invention are present. In Figs. 1 through 4, a plurality of shutters 3a are composed of forward portions 4, having laterally protruding pins 5 at the leading edges thereof; of aft portions 6a terminating at the trailing edges thereof in hinges 7; and of joining hinges 8. The pin portions of the hinges 7 are fixed to the fuselage nose 2 just aft of the trailing edge 9 of the cowling 1, while the protruding pins 5 of the shutters 3a are slidingly attached to the same structure (forward of the aforesaid trailing edge 9) by means of a plurality of oppositely disposed L-shaped slotted brackets 10. The leading edge of the cowling 1 is provided with a conventional beading 11. As described above, the shutters 3a are in a position closing off air flow from the interior of the cowling 1.

The manner in which adjustment of the shutters 3a is accomplished by means of a control mechanism 12 is clearly shown in Figs. 3 through 5. Each shutter 3a is operably connected to an associated extending and contracting mechanism 13 composed of a link 14, an operating lever 15, a supporting bracket 16, and a mounting pin 17. Fig. 5 shows how the two extremities of each link 14, as well as the pin portions of the hinges 8 and levers 15 are so formed as to permit ready tilting of the links 14 both longitudinally and laterally under the dual arcuate travel of their two end points of attachment. The supporting brackets 16 are riveted to the under side of the fuselage nose 2, as indicated, while the levers 15 are prevented from detachment with the mounting pins 17 by means of cotter pins 18. The eighteen extending and contracting mechanisms 13 (employed in Figs. 1 through 7) are commonly joined with the control mechanism 12 to act in unison as a single unit, by means of lever connecting links 19, clevis pins 20, and clevis cotter pins 21. The control mechanism 12 consists of a pilot-controlled operating rod 22, having a projecting lever 23; of a forward operating rod supporting bracket 24 riveted to the under side of the fuselage nose 2; and of such other supplemental supports and lever mechanisms as are found in any like control mechanism of conventional character. The lower extremity of the projecting lever 23 is operably connected to the extending and contracting mechanisms 13 of the shutters 3a by means of two connecting links 25, clevis pins 26 and cotter pins 21. Thus, complete counter-clockwise rotation of the lever 23 (through angle beta) into the dotted position shown in Fig. 3, effects complete retraction of the shutters 3a against the outer surface of the fuselage nose 2, permitting unrestricted air flow through the annular passageway formed by the inner surface of the cowling 1 (adjacent trailing edge 9) and the outer adjacent surface of the fuselage nose 2. Lesser movements of the lever 23 effect correspondingly lesser openings of the aforesaid annular passageway to unrestricted air passage, thereby lessening cooling effect upon engine cylinder temperature.

In Fig. 6, the aft portion 6a (of Figs. 1 through 4) is replaced by a slightly foreshortened aft portion 6b, otherwise the component parts of the shutters 3a and 3b are the same. Attachment of the shutter 3b, however, is transferred from the fuselage nose 2 to the under surface of the cowling 1. Resulting forwardly positioning of the joining hinge 3, with respect to the trailing edge 9, necessitates forward movement of the supporting bracket 16. This requires substitution of new links 27 for former links 14, of new forward operating rod supporting brackets 28 for the former brackets 24, and slight foreshortening of the former lever connecting links 19 and connecting links 25, shown in Figs. 3 and 4 (redesignated "29" and "30," respectively). It should be further noted that the lever (15) positioning of Fig. 6 is just reversed to that of the lever (15) positioning of Fig. 4, such that clockwise movement of the projecting lever 23 will effect opening, and counter-clockwise movement thereof closing, of the shutters 3b.

The shutter construction of Fig. 7 differs materially from that of former shutters 3a and 3b. Redesignated shutter 31 consists of a fore arm 32 having its forward end hinged at "33" to the inner surface of the cowling 1; of an aft arm 34 having its rear end pivotally secured to a hinge 35 forming the leading edge of a rectangular plate 36, slightly convexed at its outer surface to slide smoothly against the concaved inner surface of the cowling 1; and of a second hinge or wire member 37. The ends of both the hinge 35 and wire member 37 extend beyond the laterally disposed edges of the plate 36 to enter into and be longitudinally guided by slots 38 provided in two oppositely disposed L-shaped brackets 39 fixed to the under rear surface of the cowling 1. The rear end of the fore arm 32 and the front end of the aft arm 34 are operably connected by a pin 40 to the upper extremity of a new link 41 required because of a still further forward movement of the supporting bracket 16 (over the showing of Fig. 6). A new forward operating rod supporting bracket 42 is also required, as is foreshortening of former lever connecting links 19 and connecting links 25, shown in Fig. 3 (redesignated "43" and "44" respectively). With clockwise movement of the projecting lever 23, the aft extensible and retractable portion of the shutter 31 is varyingly extended into the dotted outline shown aft of the trailing edge 9 of the cowling 1, thereby varyingly impeding air flow through the annular passageway formed by the inner surface of the cowling 1 and the outer adjacent surface of the fuselage nose 2. Engine cylinder temperature is increasingly raised with increasing restriction to normal air flow through the aforesaid annular passageway.

Although the description is specific to the illustrations in the drawings, it is to be understood that there may be numerous departures therefrom which will still be within the field and scope of our invention, so that we do not wish to be restricted thereto, but only in so far as the appended claims are so limited.

What is claimed is:

1. A cowling for an air-cooled engine of an aircraft, comprising an annular member adapted to be positioned around the engine and arranged with respect to the nose of the aircraft fuselage to provide therewith a substantially streamlined contour having an annular discharge opening therein and a longitudinally extensible and retractable shutter means disposed within said opening and in the neighborhood of the trailing edge of said annular member for circumferentially uniformly varying said opening without materially affecting said streamlined contour.

2. A cowling for an air-cooled engine of an aircraft, comprising an annular member adapted to be positioned around the engine and arranged with respect to the nose of the aircraft fuselage to provide therewith a substantially streamlined contour having an annular discharge opening therein and longitudinally extensible and retractable shutter means disposed within said opening and in the neighborhood of the trailing edge of said annular member for circumferentially uniformly varying said opening to regulate the flow of air therethrough and progressively improve the laminar condition of the air flow over said cowl and fuselage with change in said discharge opening from maximum to minimum.

3. In an aircraft having an air-cooled engine and a mounting structure therefor, an annular cowling surrounding said engine and providing with the mounting structure of said aircraft a substantially streamlined contour having an annular discharge opening therein and a longitudinally extensible and retractable shutter means supported by the nose of said nacelle and disposed within the projected area of the trailing edge of said cowling for circumferentially uniformly varying the effective area of said discharge opening and for diminishing streamlined discontinuity during variation of said discharge opening from maximum opening to minimum opening.

4. In an aircraft having an air-cooled engine and a mounting structure therefor, an annular cowling surrounding said engine and forming with mounting structure a substantially streamlined contour having an annular discharge opening therein, a longitudinally extensible and retractable shutter means disposed within said opening and in the neighborhood of the trailing edge of said cowling for circumferentially uniformly varying said opening, said shutter means being further disposed within the confines of said streamlined contour in all positions of adjustment thereof, and means for controlling the adjustment of said shutter means.

5. In an airplane having a radial engine mounted upon the fuselage nose, an annular cowling supported by said fuselage nose and completely surrounding the cylinders of said radial engine, the rear portion of said cowling being spaced from the outer surface of said fuselage nose in such a manner as to form an annular discharge passageway therebetween, and an extensible and retractable shutter means carried directly by said fuselage nose and disposed within said discharge passageway for circumferentially uniformly varying restriction of air flow therethrough without increasing the drag of said airplane.

6. In an airplane having a radial engine mounted upon the forward face of the fuselage nose, an annular cowling supported by said fuselage nose and completely surrounding the cylinders of said radial engine, the rear portion of said cowling being spaced from the outer surface of said fuselage nose in such a manner as to form an annular discharge passageway therebetween, a longitudinally extensible and retractable shutter means carried by said fuselage nose and disposed within said discharge passageway for circumferentially uniformly varying restriction of air flow therethrough without increasing the drag of said airplane, and means for remotely controlling operation of said shutter means.

7. In an airplane having a radial engine mounted upon the forward face of the fuselage nose, an annular cowling supported by said fuselage nose and completely surrounding the cylinders of said radial engine, the rear portion of said cowling being spaced from the outer surface of said fuselage nose in such a manner as to form an annular passageway therebetween, a plurality of shutters adapted to be extended or contracted radially within said annular passageway for varyingly restricting air flow therethrough without increasing the drag of said airplane, and means carried by said fuselage nose for remotely controlling operation of said shutters.

8. In an airplane having a radial engine mounted upon the forward face of the fuselage nose, an annular cowling supported by said fuselage nose and completely surrounding the cylinders of said radial engine, the rear portion of said cowling being spaced from the outer surface of said fuselage nose in such a manner as to form an annular passageway therebetween; a plurality of biportioned shutters radially disposed within said annular passageway, the open end of each outer portion being hinged to the fuselage nose aft of the trailing edge of said cowling, and the open end of each inner portion being longitudinally slidably secured to the fuselage nose forward of the trailing edge of said cowling, such that the joining hinge of each pair of portions is parallel to and substantially within the plane of said trailing edge during shutter operation; and remotely controlled means adapted to simultaneously extend from or contract to the outer surface of the fuselage nose all of said joining hinges for varyingly restricting air flow through said annular passageway without increasing the drag of said airplane.

9. In an airplane having a radial engine mounted upon the forward face of the fuselage nose, an annular cowling supported by said fuselage nose and completely surrounding the cylinders of said radial engine, the rear portion of said cowling being spaced from the outer surface of said fuselage nose in such a manner as to form an annular passageway therebetween; a plurality of biportioned shutters secured longwise to said cowling within said annular passageway, the open end of each rear portion being hinged to the trailing edge of said ring cowling, and the open end of each forward portion being longitudinally slidably secured to the inner surface of said cowling, such that the joining hinge of each pair of portions remains at all times in parallelism with the plane of said trailing edge; and remotely controlled means adapted to simultaneously extend from or contract to the inner surface of said cowling all of said joining hinges for varyingly restricting air flow through said annular passageway without increasing the drag of said airplane.

10. In an airplane having a radial engine mounted upon the forward face of the fuselage nose, an annular cowling supported by said fuselage nose and completely surrounding the cylinders of said radial engine, the rear portion of said cowling being spaced from the outer surface of said fuselage nose in such a manner as to form an annular passageway therebetween; a plurality of arm pairs and shutters connected in tandem to the under surface of said cowling in the neighborhood of said annular passageway, the open end of each forward arm being hinged to said cowling well forward of the trailing edge thereof and the joining hinge of each rear arm and associated shutter being longitudinally slidably secured immediately adjacent to said trailing edge, each shutter having further guiding means for holding the same in parallelism with rear cowling contour such that with said joining hinge in most forward position the rear ends of said shutters are in the plane of said trailing edge; and remotely controlled means adapted to simultaneously contract to or extend from the inner surface of said cowling all of said arm pair joining hinges for extending or contracting the rear ends of said shutters aft of said trailing edge for varyingly restricting air flow emitted from said annular passageway without increasing the drag of said airplane.

ROSCOE C. WILSON.
HAROLD W. CASE.